3,047,417
METHOD OF RENDERING GLASS BOTTLES DRIP-
LESS AND ARTICLE PRODUCED THEREBY
Richard E. Melrose, Lafayette, Calif., assignor to The
Clorox Company, Oakland, Calif., a corporation of
Ohio
Filed July 13, 1959, Ser. No. 826,432
4 Claims. (Cl. 117—37)

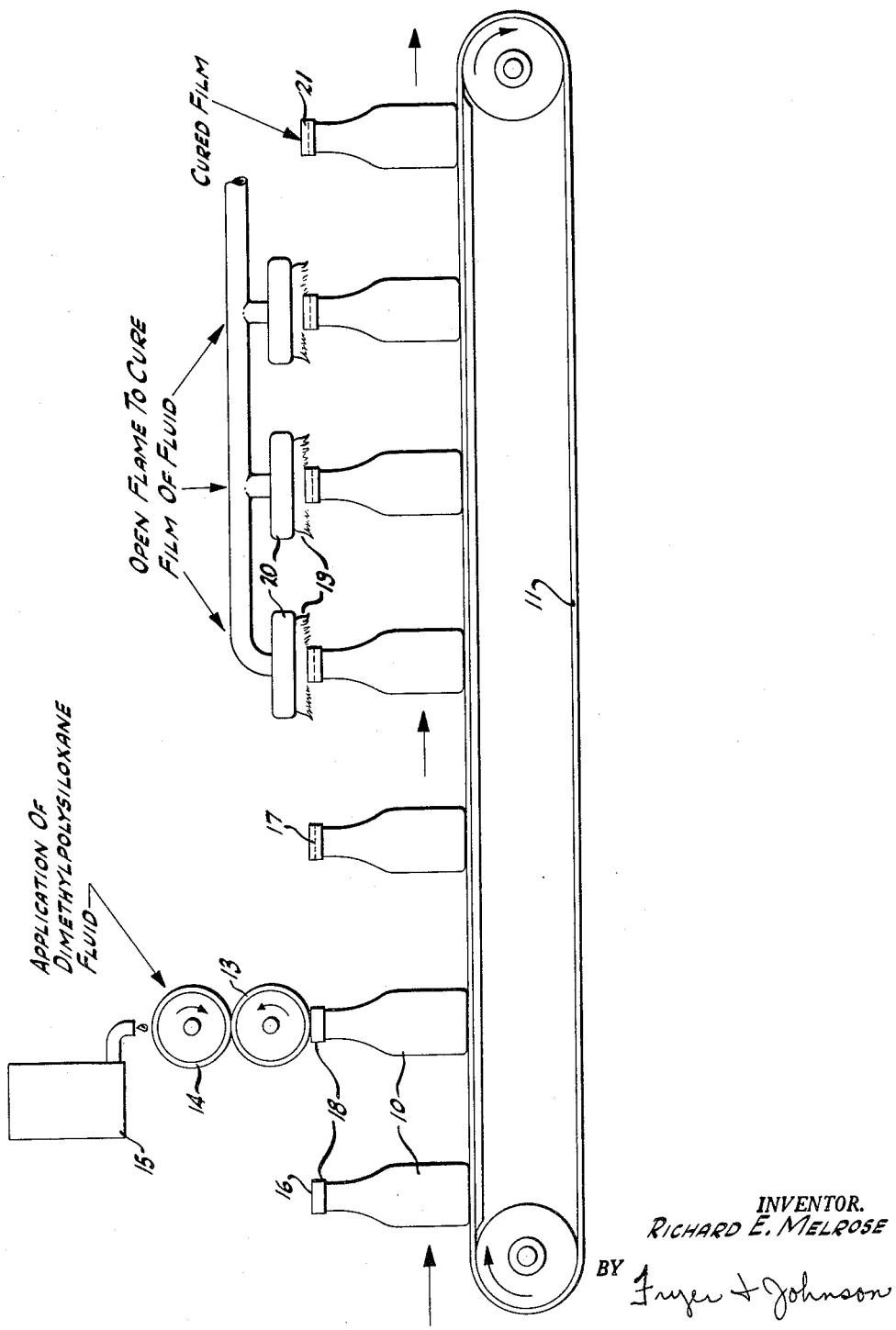

This invention relates to a method for treating glass containers to prevent dripping when the contents are poured therefrom. More particularly, it relates to a highly efficient method for applying and curing a silicone film on and around the mouth of a glass bottle intended for use with aqueous contents whereby drops of the contents are prevented from adhering to the glass surfaces of the outlet area of the bottle on pouring therefrom, thereby eliminating undesirable dripping and running-down-the-side.

It is known that the lips of glass bottles can be treated with silicone fluids to prevent the dripping of aqueous contents when they are poured from the bottles. It also is known that the silicone films which are applied to the lips of glass bottles to make them dripproof are preferably heated by baking in order to make the films hard and durable. This heat treatment of the silicone films effects a hardening, i.e. a further polymerization of the polymeric silicone compound, which is usually referred to in the art as curing.

However, the methods heretofore used for treating silicone films on glass bottles are time consuming, require large-volume heat treating equipment and are not adapted to rapid efficient production methods. There are two principal methods used for the application and curing of silicone films on glass bottles.

One method involves the application of a dilute, e.g. 2%, solution of a silicone fluid in a hydrocarbon solvent to a glass bottle followed by drying to evaporate the solvent and oven baking of the bottle for ½ to 2 hours at a temperature of 250° C. to 300° C. This method requires oven equipment and curing cycles of ½ to 2 hours which are not desirable in the high speed operations typical of modern equipment for conveying, filling and packing of glass containers. Moreover, glass containers having 1 quart to 1 gallon capacities require a large volume of expensive oven space and charging equipment. Containers of such capacities are widely used for household and industrial chemical compositions and natural liquids which contain substantial amounts of water, e.g. sodium hypochlorite bleach, vinegar, fruit juice and battery acids.

Another method is sometimes used by the glass bottle manufacturer and involves the application of a dilute, e.g. 2%, solution of a silicone fluid in a hydrocarbon solvent to the glass bottle while the bottle is in the tempering lehr. The tempering lehr is an oven at about 400° F. used in the last step of glass bottle manufacture. The idea of this operation is to utilize the sensible heat still in the bottle from its manufacture to cure the silicone film; this avoids the necessity of reheating the bottle later on. However, this method requires that the applying means preferably be of the spray type, e.g. a spray nozzle, and that it be designed especially to withstand the hot temperatures of the lehr. Moreover, additional equipment must be used with the lehr in this method to control solvent vapors and to guard against possible fire hazards stemming from use of solvents. Since not all glass bottle manufacturers have facilities for silicone treating bottles in this manner, a bottle user who desires dripless bottles must practice the method first described if he obtains untreated bottles or must pay a premium price to the manufacturer who sells silicone treated bottles. In addition, the coatings on bottles treated by the glass manufacturer have a tendency to be rendered at least partially ineffective in shipment to the filler since the pouring lips containing the coating are not protected by caps until after the filling operation.

It is an object of this invention to provide a rapid and efficient process for applying and curing a silicone film on the mouths of glass bottles which can be practiced without oven equipment. A further object is to provide such a process which is continuous in operation.

It is another object of this invention to provide a process for rapidly and efficiently forming on the mouths of bottles a silicone film which is highly water repellant, durable, resistant to attack from aqueous chemical compositions, strongly adherent to glass and which provides an improved seal with a bottle cap and easier removal of the bottle cap.

It was found that these objects are attained by applying a continuous film of dimethylpolysiloxane fluid to the sealing surface of a glass bottle and the exterior portion of the finish adjacent thereto and exposing this film to a locally applied open flame for a very brief period, insufficient to result in cracking the glass, but sufficient to raise the temperature of the skin of the glass to at least 175° F. but not greater than 350° F. thereby curing the silicone film. In view of the long baking and high temperature requirements of the prior are processes, it is surprising that impinging the open flame on the treated glass for the brief period necessary to avoid cracking the glass effects the desired curing of the film.

The single FIGURE of the drawing is a schematic side elevational view of a form of apparatus for performing the process, with appropriate descriptive legends.

The "Handbook of Glass Manufacture," by Fay V. Tooley (Ogden, 1953), discusses the accepted terms for the parts of a bottle on pages 304, 311 and 312. The sealing surface of a bottle is the uppermost horizontal surface of a bottle when it is in an upright position. It is the surface which bears against the cap to seal the bottle. The finish of a bottle is the top section containing the screw threads or other exterior details and through which the bottle is filled.

The dimethylpolysiloxane fluids used in the practice of this invention are represented by the formula

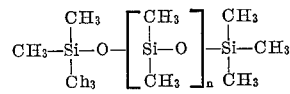

where $n$ may range up to 2,000 and higher provided the dimethyl polysiloxane is fluid at room temperature. Since the dimethylpolysiloxanes commercially available are always mixtures of polymers of various chain lengths and since the proportions of polymers of various sizes in a dimethylpolysiloxane fluid are not readily determined, such compounds are classified in terms of viscosity. Viscosity of dimethylpolysiloxanes increases proportionately with increasing molecular weight. See "Silicones," by R. N. Meals and F. M. Lewis (Reinhold, 1959), page 40. Low molecular weight dimethylpolysiloxanes have a very low viscosity (e.g. 1 to 10 centistokes at 25° C.) and are volatile. These compounds are not suitable for the practice of the present invention. The compounds used in the present process are the non-volatile high molecular weight dimethylpolysiloxanes which have a viscosity at 25° C. of about 20 to 1,000,000 centistokes, preferably 1000 to 100,000 centistokes.

These high molecular weight dimethylpolysiloxanes are used in the process of this invention because they are non-volatile, can be suitably cured by the flame treatment of this invention and because they form durable films which are highly water repellant, resistant to chemical attack and strongly adherent to glass. The dimethylpolysiloxanes are preferred for use in this invention over other silicones which provide water repellency such as diethylpolysiloxanes, methylpolysiloxanes and the phenylpolysiloxanes because the dimethyl compounds can be cured by the open flame treatment to form a highly durable coating which has an outstanding resistance to chemical attack particularly by oxidizing chemicals. These high molecular weight dimethylpolysiloxanes are also easily applied to the bottles by conventional application techniques as more fully hereinafter described.

The specific non-volatile dimethylpolysiloxane fluid chosen for use in this invention is not particularly critical. The viscosity range of the various dimethylpolysiloxane fluids compares to a range of a light oil to a moderately heavy syrup (20 to 1,000,000 centistokes at 25° C.). No difficulties in application are encountered in this range of viscosity. The viscosity of a given dimethylpolysiloxane fluid can be reduced, if desired, by dissolving the fluid in a solvent such as perchloroethylene, ethylene dichloride or carbon tetrachloride. Preferably, the dimethylpolysiloxane fluid is used without a solvent because a flame treatment of longer duration would be required if solvent must be evaporated before appreciable curing of the film can be effected.

The coating on the bottle sealing surface and the adjacent exterior portion of the finish can be applied by dipping the bottle in an inverted position into a shallow bath of the dimethylpolysiloxane fluid. A method more suited to rapid automatic operation is application of the dimethylpolysiloxane fluid to the sealing surface of the bottle in an upright position by brushing or contacting the sealing surface with a roller, pad or sponge which is impregnated with the dimethylpolysiloxane fluid. The impregnated roller, pad or sponge is kept sufficiently wet with the fluid so that a continuous film is formed not only on the sealing surface but also on the exterior portion of the finish which is adjacent to the sealing surface; the film on the finish is formed by applying a slight excess of fluid to the sealing surface so that it runs down over the finish or by pressing the applicator on the sealing surface so that the mouth of the bottle becomes imbedded in the applicator and fluid is applied to the surface of the finish. Spray-on procedures can also be used, but they are more wasteful of dimethylpolysiloxanes for obvious reasons.

It has been found that a dimethyloplysiloxane film only on the sealing surface of the bottle does not result in satisfactory dripless pouring characteristics. A film over the edge of the sealing surface and at least about one sixteenth of an inch down the exterior portion of the finish is necessary for satisfactory dripless pouring.

The amount of dimethylpolysiloxane applied to the bottle should be sufficient to form a continuous film over the sealing surface and the adjacent exterior portion of the finish thereby obtaining uniformly satisfactory non-drip characteristics. Not very much is required since excellent film characteristics can be obtained with a film only several hundred (e.g. 500) molecules thick. However, there are no disadvantages to films which are thicker than several hundred molecules. The most important requirements are that the film is continuous and that it covers the sealing surface and the adjacent exterior portion of the finish down at least about one sixteenth of an inch.

After the dimethylpolysiloxane fluid has been applied, the resulting film is subjected to a direct open flame to rapidly raise the skin temperature of that portion of the glass bottle which has been coated to at least 175° F. and not more than about 350° F. 175° F. is hot enough to cure the silicone fluid to a durable, water repellent film. The skin temperature of the botle should not exceed about 350° F. in order to avoid the risk of cracking or breaking the bottle. Moreover, and surprisingly, higher temperatures are not necessary to obtain the desired film characteristics. The preferred skin temperature range is 225° F. to 250° F.

The duration of the flame treatment in accordance with these temperature requirements will depend on the temperature of the flame and is usually less than 10 seconds. A hot intense flame will effect a more rapid treatment than a cooler flame. For example, a flame from commercial natural gas burned with air in jet burners has been found to cure the dimethylpolysiloxane coating in about 1 to 2 seconds. The flame curing effects a further polymerization of the dimethylpolysiloxane which hardens the film and chemically bonds it firmly to the glass surface. Any flame source can be utilized in the practice of the process so long as the bottle skin temperature requirements are met. For example, natural gas, butane, propane or mixtures thereof can be used. These gases can be mixed with air and the pressures of the gas and air adjusted in the well known manner to obtain a flame of the desired size and temperature. The flame or flames should be of sufficient size to contact the entire dimethylpolysiloxane film area on the bottle.

*Example*

With reference to the drawing, amber glass bottles 10 having a one-half gallon capacity were continuously moved in an upright position on a conveyor line 11. The bottles had a circular mouth having .994 inch outer diameter and .650 inch inner diameter. The bottles were at room temperature and were clean and dry. As the bottles moved along the conveyor, the mouths of the bottles were passed under a sponge cover roller 13. The roller was impregnated with undiluted dimethylpolysiloxane fluid having a viscosity of 12,500 centistokes at 25° C. (Dow Corning 200 Fluid). The roller was kept wet with fluid applied from transfer roller 14 which in turn was kept wet from a pot reservoir 15 containing the dimethylpolysiloxane fluid. A continuous coating of the fluid on the sealing surface 16 of the bottles and about one eighth of an inch down the exterior portion 17 of the finish 18 from the sealing surface was effected, the film on the finish portion 17 resulting from excess fluid running down from the sealing surface 16. The bottles were treated at a rate of about 200,000 bottles per gallon of silicone fluid.

The thus treated bottles, still moving continuously on the conveyor, were then subjected to open flame 19 directed downward onto the mouths of the bottles from a battery of 3 burners 20, each 7 inches long and 1 inch wide, arranged lengthwise along the conveyor so that each bottle mouth passed through 21 inches of flame. The dimethylpolysiloxane coated bottles moved continuously along the conveyor at a rate such that the coated portion of the bottles was in direct contact with the flame from the burners for 1.5 seconds. This flame treatment was sufficient to raise the skin temperature of the mouths of the bottles to about 225° F. The flame from the burners was ¾ inch long and 1 inch wide. It was an intense conical flame obtained by burning a mixture of natural gas supplied at a pressure equivalent to a column of water 8″ high and air supplied at 5 pounds per square inch pressure. The bottle mouths passed through the flame ½ inch from the burners and there was no cracking of the glass bottles.

The flame treated bottles were cool enough to touch with the hand 5 seconds after passing through the flame and were ready for filling. The resulting dimethylpolysiloxane films 21 on the bottles were continuous and water repellent.

The bottles were then filled with a 5¼% aqueous solution of sodium hypochlorite. There was no dripping or running-down-the-side when the solution was poured from any portion of the lip of the bottle. The bottles were closed with a metal cap and it was determined by venting tests that the dimethylpolysiloxane treated bottles had a substantially better seal than the untreated bottles. Torque tests showed that for a given tightness of seal the caps were easier to remove from treated bottles than from untreated bottles.

At the completion of an 11 month storage test, the cured dimethylpolysiloxane coating on the treated bottles showed no indication whatever of attack from the hypochlorite solution, a strong oxidizing agent.

Dimethylpolysiloxane fluids having viscosities of 1000 and 100,000 centistokes at 25° C. can be substituted respectively for the 12,500 centistoke dimethylpolysiloxane fluid in the above example with substantially equal results.

The bottles treated in accordance with the process of this invention are useful in preventing dripping or running-down-the-side during pouring of any aqueous based liquid which is contained in the bottle. Examples of such liquids include distilled water, mineral water, soft drinks, and alcoholic beverages. The bottles are particularly useful with aqueous based chemicals which may cause personal or material damage if the contents drip or run-down-the-side of the bottle while they are being poured. Examples of such chemicals are hydrogen peroxide solution and hydrochloric, sulfuric or nitric acid solutions.

What is claimed is:

1. A process of rendering glass bottles dripless comprising the steps of (1) applying a continuous film of an undiluted, non-volatile, high molecular weight dimethylpolysiloxane fluid on the sealing surface of a glass bottle, which is at room temperature, and the exterior portion of the finish immediately adjacent thereto, (2) applying an open flame directly onto the so treated area of the bottle for a period of less than 10 seconds to rapidly raise the skin temperature of the so treated area of the bottle to at least 175° F., but not greater than 350° F. thereby curing said fluid, said fluid, prior to said application, having a viscosity in the range of 1000 to 100,000 centistokes at 25° C.

2. The process of claim 1 wherein the film applied to the exterior portion of the finish is not less than one sixteenth of an inch down from the sealing surface, the skin temperature of the so treated area of the bottle is raised from 225° F. to 250° F. and the application of the open flame is 1 to 2 seconds in duration.

3. A glass bottle which has been rendered dripless by the process of claim 1.

4. A process of rendering glass bottles dripless comprising the steps of (1) forming a line of bottles in an upright position continuously moving in sequence, (2) applying to each bottle in the thus formed moving line a continuous film of an undiluted, non-volatile, high molecular weight dimethylpolysiloxane fluid, having a viscosity at 25° C. of 1000 to 100,000 centistokes, on the sealing surface of the bottle, which is at room temperature, and the exterior portion of the finish immediately adjacent thereto, the application of said film being effected by continuously passing each bottle under the source of said fluid, (3) continuously passing the mouth area of each bottle in said moving line through a downwardly directed open flame to rapidly raise the skin temperature of the so treated area of the bottle to at least 175° F. but no greater than 350° F. thereby curing said fluid, the said mouth area being in contact with the said open flame for a period of less than 10 seconds, (4) permitting the bottles to cool.

References Cited in the file of this patent

UNITED STATES PATENTS

| | | |
|---|---|---|
| 1,025,649 | Rowohlt et al. | May 7, 1912 |
| 2,074,382 | Ford | Mar. 23, 1937 |
| 2,387,213 | Chew et al. | Oct. 16, 1945 |
| 2,494,920 | Warrick | Jan. 17, 1950 |
| 2,504,482 | Goldman | Apr. 18, 1950 |
| 2,538,751 | Hill | Jan. 23, 1951 |
| 2,701,780 | Nelson et al. | Feb. 8, 1955 |